Sept. 21, 1965  R. A. COSTA ETAL  3,206,801
THREAD FORMING APPARATUS
Filed July 9, 1963  3 Sheets-Sheet 1
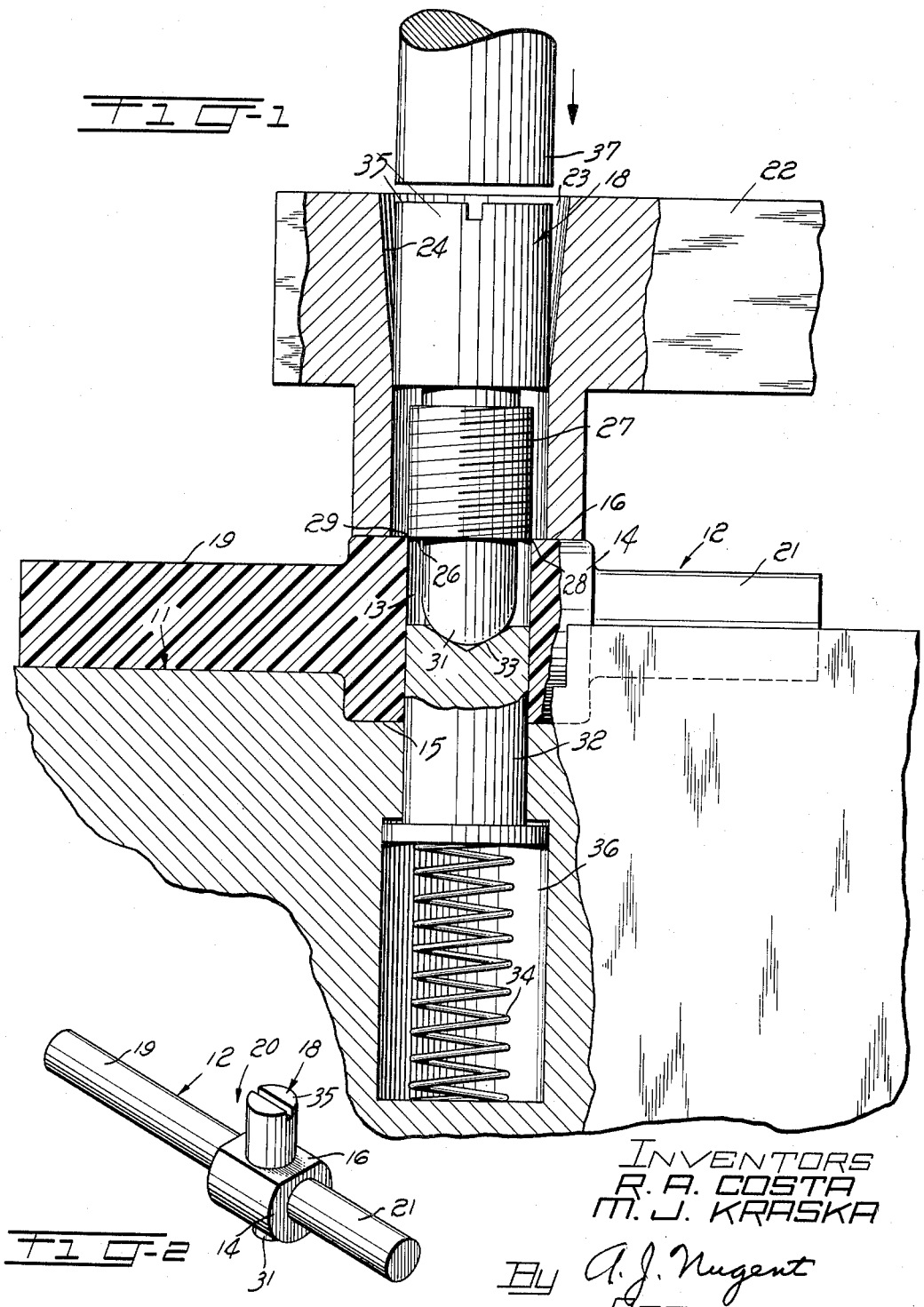
INVENTORS
R. A. COSTA
M. J. KRASKA
By A. J. Nugent
ATTORNEY

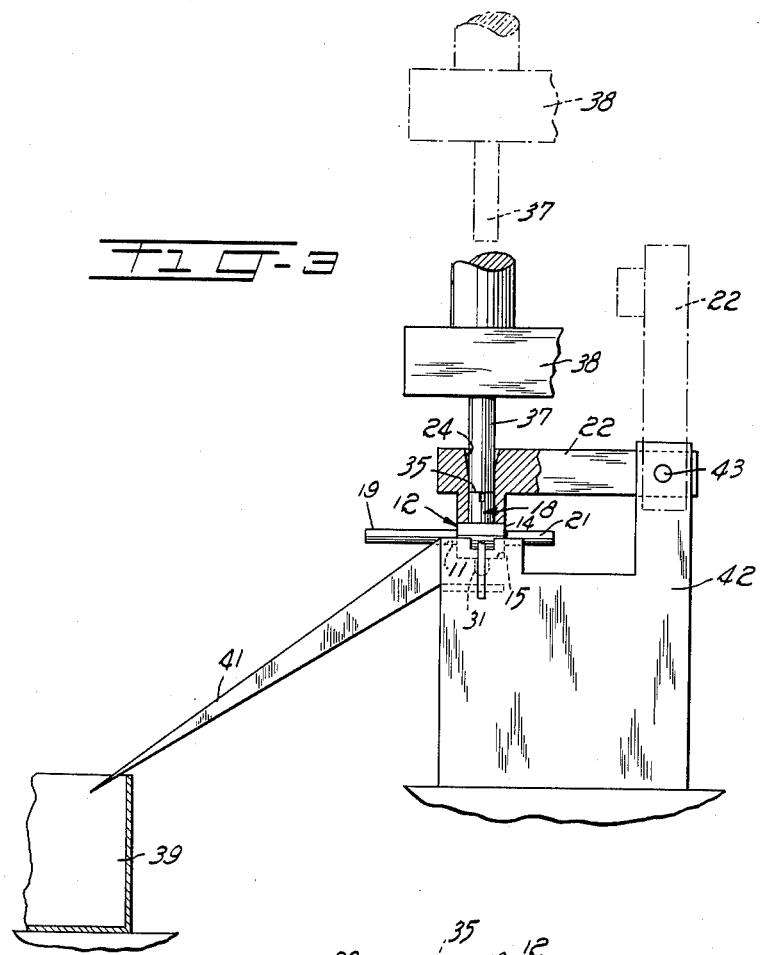
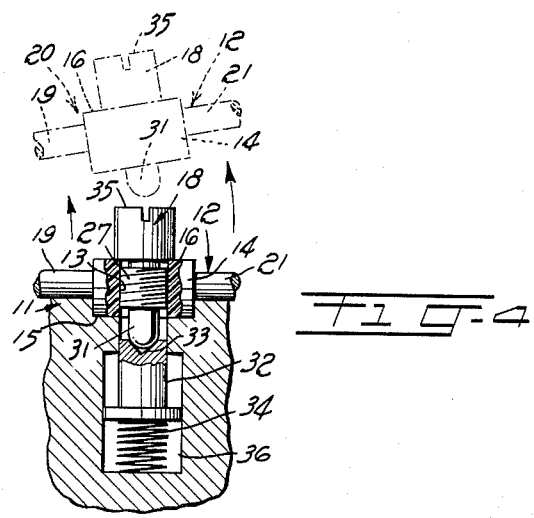

Sept. 21, 1965  R. A. COSTA ETAL  3,206,801
THREAD FORMING APPARATUS
Filed July 9, 1963  3 Sheets-Sheet 3
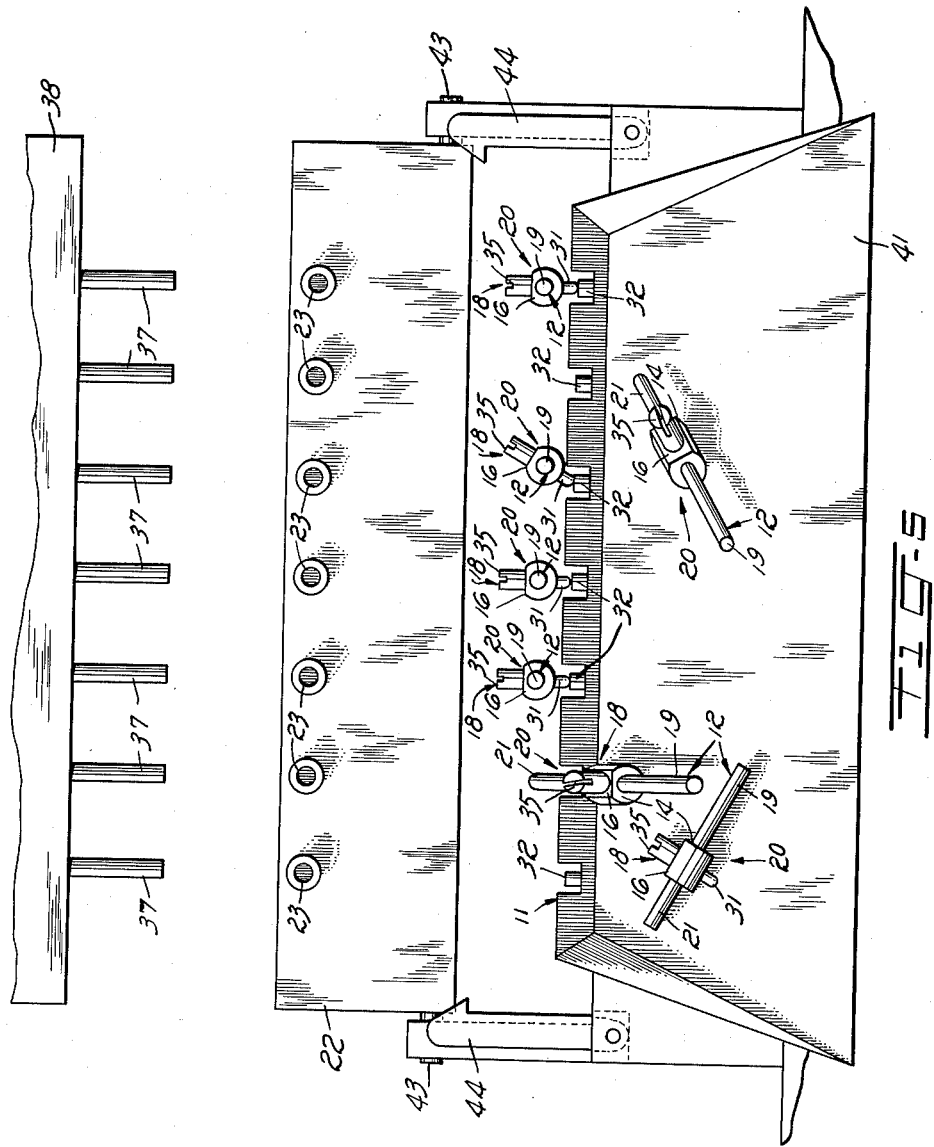

United States Patent Office 3,206,801
Patented Sept. 21, 1965

3,206,801
THREAD FORMING APPARATUS
Robert A. Costa, East Rutherford, and Marinus J. Kraska, Montclair, N.J., assignors to Western Electric Company, Incorporated, New York, N.Y., a corporation of New York
Filed July 9, 1963, Ser. No. 293,705
2 Claims. (Cl. 18—5)

This invention relates in general to the assembly of threaded members and, in particular, to an apparatus for forming threads in materials capable of cold flow, for example, a plastic such as nylon.

In large scale production, the assembly of mating threaded parts is usually a time consuming and relatively expensive operation. A typical assembly sequence includes separate tapping and driving operations to secure an externally threaded part to an internally threaded member. Where great numbers of parts of small size are involved, such as plunger subassemblies for telephone key equipment, it is desirable to find a faster and more economical assembly method. The plunger subassembly comprises a metallic threaded member, used for adjustment purposes, mounted in a nylon part.

In the case of the aforementioned plunger subassemblies, a solution of the assembly problem may be realized by taking advantage of the elastic flow properties of the nylon materials used in making the plunger. Nylon, which is generally brittle when dry, is susceptible of cold flow under normal conditions of humidity. It has been found that a threaded member and the nylon plunger may be economically assembled by forcing the threaded member into the unthreaded plunger aperture in an interference fit. When nylon is subjected to stress under such conditions the materials along the walls of the aperture flows towards points of low stress concentrations resulting in a permanent thread being formed about the threaded member. Consequently, no tapping is required and the parts may be readily assembled by merely using a punch press for the mating operation.

Accordingly, an object of this invention is to provide an apparatus for simplifying and expediting the assembly of threaded members.

Another object of this invention is to provide a thread forming apparatus for economically forming threads in material subject to cold flow such as nylon.

In its broader aspects, the invention comprises an apparatus for use in the method of forming threads in a material capable of cold flow comprising mounting an article having an aperture on a support, and forcing, without rotation, a threaded member of slightly larger diameter than the aperture into the aperture a predetermined distance to cause a cold flow of material at the aperture about the threads of the threaded member.

With these and other objects and advantages in mind, one embodiment of the present invention contemplates an apparatus which comprises a nest for receiving a plurality of nylon or plastic parts having an aperture molded therein and guide means located above the nest to receive a plurality of threaded members. The threaded members are forced into the plunger apertures in an interference fit by a set of driving fingers mounted on the ram of an air cylinder. The nylon material is forced away from the walls of the plunger aperture in a type of cold flow by the descending threaded member of greater diameter and flows towards areas of lower stress concentration. As a result, the material forms an internal thread about the threaded element which may later be withdrawn or adjusted within the aperture by rotation in the usual manner. No tapping is required and a plurality of threaded parts may be economically assembled in a single operation. Furthermore, this invention may be employed to shape or cold work thermoplastic materials without the application of heat.

These and other objects and advantages of the present invention will be apparent from the following detailed description when considered in conjunction with the following drawings:

FIG. 1 is an enlarged cross-sectional view which illustrates the more important aspects of the novel apparatus disclosed herein;

FIG. 2 is an isometric view of a plunger subassembly comprising a threaded member mounted within a plastic plunger;

FIG. 3 is a side view of the apparatus, parts of which are broken away;

FIG. 4 ilustrates a completed subassembly positioned in a nest and the unloading action of the apparatus after an assembly operation with an ejected part being depicted in phantom; and FIG. 5 is a front view of the apparatus during an unloading operation.

With reference to FIG. 1 of the drawings, the invention in a preferred embodiment comprises a nest 11 for receiving one or more parts such as nylon plungers 12 having an aperture 13 located therein. A typical plunger 12, best seen in FIG. 2, includes a main body portion 14 which is cylindrical except for a flat upper surface 16, there being an aperture 13 extending perpendicularly to the surface 16 through the body portion. The rounded bottom surface of the body portion 14 is placed into suitable grooves 15 in the nest 11 while the flat upper surface 16 serves as a bearing area for threaded members 18 which are to be assembled to the plunger 12. A pair of relatively narrow cylindrical projections 19 and 21 extend axially from the body portion 14 in both directions, projection 19 being slightly longer than projection 21. While the plunger design is intended primarily to perform a contact control function in electrical apparatus, its configuration also facilitates handling during the assembly process and provides sufficient rigid material about the transverse aperture 13 to permit thread forming by the method described herein.

A guide member 22 having holes 23 with a suitable clearance or internal taper 24 to facilitate loading of screws 18 is locked in place above the nest 11, see FIG. 3, and threaded members or screws 18 are placed in the guide holes 23. In the illustrated embodiment, a .138–40NF-2A fillister type flat head machine screw is employed for insertion into an aperture diameter of approximately .125 inch. When the guide member 22 is loaded, the bottom thread 26 on the threaded portion 27 of member 18 is accurately positioned about the edge 28 of the plunger aperture 13 which includes a slight draft of approximately 0'15" to facilitate the entry of screw 18 under cold flow conditions. Since the major diameter of the thread is larger than the opening by a predetermined increment 29, the threaded portion 27 remains above the opening 13.

A narrow lead portion 31 on screw 18 rests in a resiliently backed element 32 having a substantially V-shaped groove 33 to accommodate and guide the screw 18 which may include a mating chamfered edge. In the unassembled condition, illustrated in FIG. 1, the supporting element 32 rides within the plunger aperture 13 under the urging of spring 34 but when the parts have been assembled, as shown in FIG. 4, the element 32 is depressed into the spring cavity 36. The screw 18, in a preferred embodiment, includes a flat head 35 to facilitate driving operations and prevent possible distortion under compressive force.

As depicted in FIG. 5, one or more driving fingers 37 are mounted above the guide element 22, on the ram 38 of an air cylinder (not shown). After the plungers 12 have been placed in the nest 11 and have been loaded with threaded members 18, the press is actuated. The downward movement of the ram 38 causes the elongated members or fingers 37 to force the threaded members 18 into an interference fit with the nylon body producing plunger assemblies as shown in FIG. 2. The cold-worked nylon material initially tends to give along the walls of the aperture 13 in a type of elastic flow in order to accommodate the larger thread diameter. Since the material is confined by the threaded member 18, it forms thereabout between the root and crest of the threads in the configuration of an internal thread without the clearance normally caused by tapping. The screw 18, therefore, advantageously bears on substantially the entire thread.

In the illustrated embodiment, the threaded portion 27 of the screw 18 is smaller than the depth of the aperture and the lead portion 31 is quite narrow so that no external burrs are produced and the elastically deformed nylon is free to expand within the opposite end of the aperture. Of course, while the invention is illustrated thusly, it is not necessary for the aperture 13 to extend completely through the plunger 12 and threads may be formed to any predetermined depth within the aperture 13.

The formed thread takes on a permanent set so that the threaded member or screw 18 can be withdrawn by rotation leaving a threaded aperture or it may be adjusted as need be within the aperture for operational purposes. No separate tapping operation is required and this method can be employed to produce threaded assemblies rapidly and economically. Manifestly, this technique is also feasible with other plastic or cold flow materials such as Teflon, which have resilient properties when deformed below the elastic limit and it may also be advantageously employed to assemble threaded parts to apertures having a variety of configurations. As a further advantage, it is unnecessary to heat the plungers 12 to place the material in a plastic state but undoubtedly, satisfactory results could be achieved by heating either the plunger 12 or screw 18 or both.

After the screws 18 have been driven into the apertures 13, the pivotal guide element 22 is raised, as shown in the phantom view in FIG. 3, and the assembled parts 20 are ejected from the nest 11 by the action of spring 34, see FIGS. 4 and 5. The assemblies 20 may then be conveniently gathered in a suitable receptacle such as bin 39 at the end of chute 41. For the next sequence, the nest 11 is loaded with plungers 12, usually by hand. The guide element 22 which is pinned to the frame 42 at 43 is then lowered and locked in place by hooked elements 44. The guide element 22 is loaded with screws 18 and the operation proceeds in the manner previously described.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for forming internal threads in plastic parts having apertures during assembly of a threaded part of larger diameter thereto comprising:
   a nest having a plurality of substantially U-shaped slots to receive the plastic parts,
   a spring-backed element protruding vertically upward at the base of each U-shaped slot to engage the aperture of a plastic part inserted in the nest,
   a notched upper surface on each element to align a threaded part prior to insertion,
   a guide pivotally mounted above the nest having a plurality of tapered holes, each hole corresponding to a separate nest slot in order to facilitate loading of threaded parts,
   a plurality of elongated members mounted above the guide, and
   means for actuating the elongated members to drive the threaded parts into the plastic parts in an interference fit causing a cold flow of material within the aperture and thereby forming an internal thread.

2. An apparatus for fabricating assemblies including a threaded member and a plastic part having an unthreaded aperture comprising:
   a nest having a plurality of lots for receiving a corresponding plurality of plastic parts,
   a spring-backed element protruding vertically upward within each slot to engage the unthreaded aperture of a plastic part, said element having a notched upper surface for initially aligning a threaded member with reference to the aperture,
   a guide pivotally mounted above said nest having a plurality of holes including tapered entry portions for receiving threaded members to be inserted into the unthreaded apertures of the plastic parts,
   a plurality of elongated members mounted above the guide, each member being positioned opposite an aperture in a plastic part, and
   means for actuating the elongated members to force the threaded members into the plastic parts and depress the spring-backed elements which eject the assemblies when the guide is pivoted from a loading position.

References Cited by the Examiner

UNITED STATES PATENTS

| | | | |
|---|---|---|---|
| 740,036 | 9/03 | Oelkers | 264—318 |
| 2,304,036 | 12/42 | Tegarty. | |
| 2,788,829 | 4/57 | Edwards | 151—7 |
| 3,001,567 | 9/61 | Brill | 151—7 |
| 3,006,030 | 10/61 | Paull | 264—318 |
| 3,022,701 | 2/62 | Potruch | 85—2.4 |
| 3,054,145 | 9/62 | Helpa | 264—318 |
| 3,074,292 | 1/63 | Polmon | 29—525 |

ALEXANDER H. BRODMERKEL, *Primary Examiner.*

EDWARD C. ALLEN, ROBERT F. WHITE,
*Examiners.*